No. 649,595. Patented May 15, 1900.
W. Z. BROWN.
PULVERIZING LEVELER.
(Application filed Aug. 7, 1899.)

(No Model.) 2 Sheets—Sheet 1.

Witnesses
John F. Deufferwid
Chas. S. Hyer

By his Attorneys, William Z. Brown,
C. A. Snow & Co.

Inventor

THE NORRIS PETERS CO., PHOTO-LITHO., WASHINGTON, D. C.

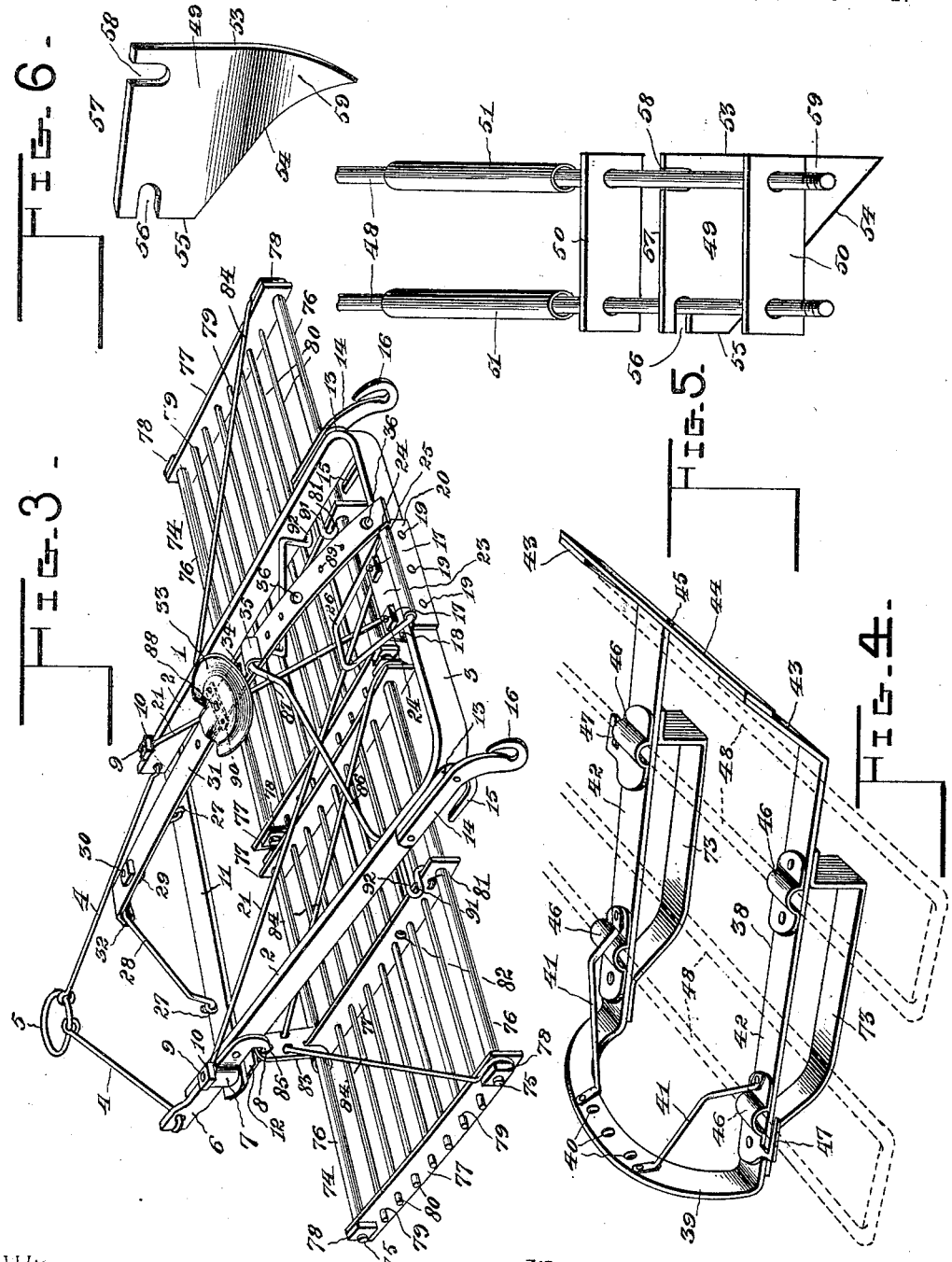

UNITED STATES PATENT OFFICE.

WILLIAM Z. BROWN, OF ATLAS, ILLINOIS, ASSIGNOR OF ONE-HALF TO WILLARD JAMES, OF SUMMER HILL, ILLINOIS.

PULVERIZING-LEVELER.

SPECIFICATION forming part of Letters Patent No. 649,595, dated May 15, 1900.

Application filed August 7, 1899. Serial No. 726,425. (No model.)

*To all whom it may concern:*

Be it known that I, WILLIAM Z. BROWN, a citizen of the United States, residing at Atlas, in the county of Pike and State of Illinois, have invented a new and useful Pulverizing-Leveler, of which the following is a specification.

This invention relates to that class of agricultural implements designed particularly for pulverizing and leveling the soil preparatory to planting and other analogous purposes.

One object of the invention is to reduce and materially lighten the draft and to provide for a thorough breaking up and pulverizing of clods and lumps of earth without packing down the upper surface of the soil so treated, but leaving it in a soft open condition, so as to render it in the best possible condition for the reception of the seed.

A further object of the invention is to simplify and improve the general construction of pulverizing and leveling implements and provide for a joint use of different parts together and singly by replacing one by the other, and thus combine in one machine several implements and dispense with independent devices for similar purposes, thereby materially reducing the labor of pulverizing and leveling and also the cost.

Other objects and advantages will appear in the subjoined description and also the novelty pointed out in the claims, an embodiment of the invention in different arrangements being illustrated in the accompanying drawings, in which—

Figure 1:
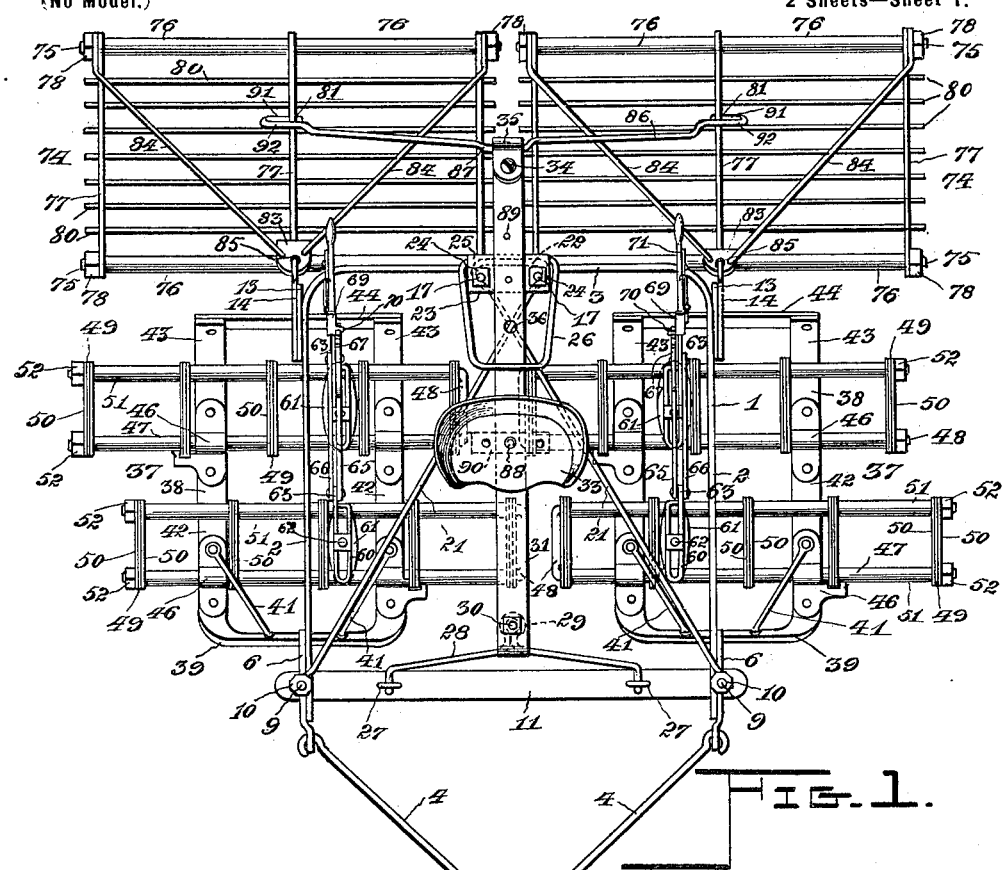
Figure 2:
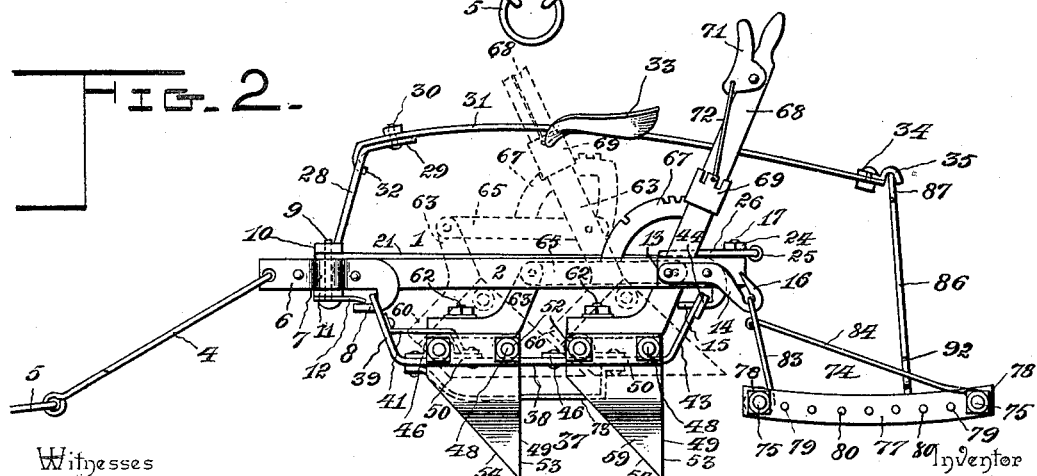

Figure 1 is a top plan view of the improved pulverizing and leveling device shown complete. Fig. 2 is a side elevation of the improved machine. Fig. 3 is a perspective view of the device shown arranged as a leveler alone. Fig. 4 is a similar view of one of the cutter-frames. Fig. 5 is a detail perspective view of one of the cutters and the parts for supporting the same shown separated to illustrate the mode of application. Fig. 6 is a detail perspective view of one of the cutters.

Similar numerals of reference are employed to indicate corresponding parts in the several views.

The numeral 1 designates a main frame comprising opposite longitudinally-disposed side bars 2, continuous with a rear end bar 3, the said side bars being clear at their front terminals and having draft-rods 4 movably connected thereto and which run to a draft-link 5. On the outer sides of the front extremities hook-plates 6 are firmly fixed and are formed with intermediate outstanding bends 7, as more clearly shown in Fig. 3, the rear ends of said plates terminating in downwardly-directed hooks 8, which are below the plane of the under edges of the side bars 2. The link-rods 4 are attached to the front terminals of the said plates 6, and the outstanding bends 7 provide seats for opposite vertically-disposed bolts 9, having securing-nuts 10 thereon, the said bolts being passed through the opposite extended ends of a cross-brace 11 and also through keepers 12, applied to the under surface of the outer end portions of the said brace. The bolts are inserted through the keepers 12, extended ends of the brace 11, and seats 7 from the under side, and the nuts 10 are located at the top. The keepers 12 extend into the hooks 8 of the plates 6 and are of a resilient nature to thereby serve as means for holding the devices that engage the said hooks in place against accidental disconnection.

At the rear of each of the side bars 2 a pair of hook-plates 13 and 14 are secured, the plates 13 having downwardly-turned forwardly-extending hooks 15 and the plates 14 projected rearward at a downward inclination and terminating in upturned hooks 16. At the center of the rear cross-bar 3 of the frame 1 two bolts 17 are held by means of a clip 18 and in spaced relation, the said clip being fastened by bolts or analogous devices 19 extending therethrough and through a back plate 20, as clearly shown in Fig. 3. The front diverging terminals of a crossed brace-rod 21 are secured by the nuts 10 on the bolts 9, and at the rear the said rod is looped, as at 22, and placed around the upper parts of the bolts 17 under a plate 23, also secured in place by the said bolts, the latter having applied thereto nuts 24, which rest on the top surface of the said plate 23, and thereby firmly secure the rear portion of the brace-rod. The hingeplate 23 is formed with an elongated loop or eye 25, and therein is movably fitted a stop-link 26, which operates in a manner hereinafter set forth. The crossed brace-rod 21 strengthens the frame 1 and holds the opposite sides in shape, as well as resists the tendency toward an outward or inward bend that might arise from extraneous pressure applied in opposite directions.

The brace 11 has upwardly-projecting eyes 27 secured therein, to which is movably attached a bail 28, having the central part contracted and formed into an eye 29 to receive a fastening-bolt 30, carried by an elongated yielding seat-support 31, against the under side of the front extremity of which the said eye 29 is applied, the front terminal of the support being bent downwardly over the contracted part of the bail, as clearly shown in Fig. 2, and provided with a tongue 32, which passes between the parts and in advance of the contraction of the bail. This arrangement serves to prevent the support 31 from moving on the bail in a lateral direction, and at a suitable point intermediate of the said support a seat 33 is attached. In the arrangement shown by Fig. 1 the rear extremity of the support 31 is inserted through the stop-link 26; but when the parts are reduced in number, as shown by Fig. 3, said support is free of the link, the latter being allowed to drop over on adjacent parts.

Secured to the rear portion of the support 31 by a suitable removable fastening 34 is a clip-hook 35, which is adjustable, openings 36 being formed in the said support at the rear end and slightly in advance of the latter to removably receive the fastening 34.

Adjustably suspended from the frame 1 are opposite gangs of cutters 37, each comprising a cutter-frame 38, as clearly shown by Fig. 4, having a front upwardly-extending arch 39, with a series of openings 40 at about the center thereof, the said arch being supported in a rigid manner by rearwardly-projecting braces 41, connected thereto and also to the opposite side bars 42. The rear ends 43 of the said side bars are upturned at a slight obliquity and connected by a cross-tie 44, which has a central opening 45 therein. On the opposite bars 42 in parallel relation bearing-straps or analogous devices 46 are attached, and one of each pair, respectively, at the front and rear, on opposite sides, has a laterally-extending rearwardly-projecting hook 47, for a purpose which will be presently set forth. The bearing-straps 46 movably receive the front legs of elongated substantially U-shaped cutter-holders 48, the terminals of the said holders being disposed outwardly, and by movably applying one leg of each a swinging adjustable movement can be obtained to regulate the depth of penetration or position of a plurality of cutters 49, removably mounted thereon at predetermined intervals apart. The cutter-holders 48 are prevented from having endwise movement by means of the hooks 47 on a part of the bearing-straps 46, as set forth, the said hooks engaging cutters adjacent thereto and affording means for sustaining the series of cutters in each gang in proper working relation to each other. The cutters 49 are held on the legs of the holders 48 by pairs of clamping-plates 50, having opposite end apertures or openings, through which the said legs extend. The clamping-plates are endwise adjustable or slidable on the said legs of the holders and have between them space-sleeves 51, which, as shown, are equal in length; but an obvious change would be to have them vary and position the cutters nearer together at one end or the other or intermediately, as the condition of the soil and circumstances might require. These space-sleeves 51 surround the legs of the holders 48, and when all the cutters are regulated as to their interval nuts 52 are fitted on the terminals of the legs of the holders.

Each of the cutters 49 is of substantially-triangular form and when applied is inverted or has its apex free to thereby present a rear vertical edge 53 when said cutters are in straight working position, and the front inclined or oblique edge 54 does not extend from one corner to the other, but from the apex to a front edge 55, parallel with the edge 53. The front edge 55 has a slot 56 therein, parallel with the top edge 57, and the latter edge at the rear has a slot 58, parallel with the edge 53. It will be observed that both of these slots 56 and 58 open out, respectively, through the edges 55 and 57, and by this means the cutters can be removed or applied independently without disconnecting all of the same in a series. In applying the cutters the nuts 52 are loosened, so as to permit separation of the clamping-plates 50, and when this has been attained the slot 56 is first fitted over the front leg of each holder and the slot 58 then brought up over the rear leg, the slots 56 and 58 being approximately of the same length, and when applied the edge 57 of the cutter will be parallel with the upper edges of the clamping-plates 50. By tightening the nuts 52 the clamping-plates are brought to bear firmly against opposite sides of the upper portions of the cutters, and a firm securement results. Each of the cutters has its reduced extremity deflected, as at 59. In the present instance this deflection is in an outward direction, and when the cutters of all the series are arranged in the opposite gangs the cutters of one gang will be reverse to those of the other, and consequently the cost of manufacture and inconvenience arising from a particular form of cutter for opposite sides are entirely avoided. By this is meant that one pattern only is required, and a similar operation is carried on in forming the deflections. It is preferred that the cutters be made of thin or sheet metal, and when applied to their frames in operative relation the rear series in each gang are located between the spaces of the front series. By making the holders 48 of substantially U-shaped form or continuous at one end the nuts 52 can be more readily loosened or tightened, as it is obvious that the legs of the holders will not rotate or move, and which disadvantage would be present if the holders were in separate parts.

On each series of teeth looped shoes 60 are applied by means of clamping-plates 61 and nutted clamping-bolts 62, the shoes resting on top of the sleeves 51 between two teeth and the clamping-plates bearing against the under portions of said sleeves. The clamping-bolts 62 extend upwardly through the shoes 60, and the latter have at their rear terminals upwardly-extending arms 63, which are connected by a pair of links 65 and 66. The links 65 and 66 are pivoted to the said arms, and one of the same is provided with a toothed segment 67, the arm 63 of the rearmost shoe being elongated in the form of a shifting lever 68, which stands close to the segment 67 and has thereon a movable flat sleeve 69, with a lower projecting lug 70, adapted to fit in the teeth of said segment. The sleeve 69 is connected to a movable latch-grip 71, pivoted on the lever 68 by means of the link-rod 72. By pulling rearward on the lever 68 in each gang the rear series of teeth are thrown down, and simultaneously through the links 65 and 66 the front series of teeth are likewise positioned. This adjustment can be varied to bring the teeth either directly vertical or at an angle relative to their supporting parts, having a degree less than the maximum adjustment. By moving the levers in the opposite direction the teeth will be reversed or so that the edges 54 will vary relative to the ground-surface and which is necessary in passing obstructions. It may be also required at times to vary the angle of the front edges 54 of the teeth to accommodate light cultivation, and it will be understood that the nearer the rear edges 53 are brought to a perpendicular line the greater will be the penetration of the deflected reduced ends of the teeth and the more vigorous the cultivation.

The adjustment of the teeth just described is carried on independently of any movement of the frames 38, and the latter are suspended from the main frame 1 by causing the hooks 8 and 15 to respectively engage one of the openings 40 in the arch 39 of the said frames 38 and the opening 45 in the cross-tie 44 at the rear of the cutter-frames. The rear portions of the cutter-frames are not adjustable on their hooks 15; but the angle of the frames can be varied by causing the hooks 8 to engage either of the openings 40 on opposite sides of the central opening of the series. When the hooks are in the outer openings 40, the frames 38 are held at an inward angle, and the cutters are likewise disposed at an angle, which in some instances will be very effectual in treating the soil. When the hooks 8 are inserted in the innermost openings 40, the frames 38 are shifted at an outward angle and the teeth 49 correspondingly changed with obvious advantages. Normally the teeth 49 will have their upper portions arranged parallel with the side bars 2 of the frame 1, and, aside from the adjustments mentioned, the cutter-frames 38 remain constant and are never varied as to their relation. Fixed to the under sides of the bars 42 of the cutter-frames are runners 73, consisting of strap metal bent in the form of runners and riveted or otherwise fastened to the said bars 42. These runners operate similarly to other devices of this character and rest on the surface of the ground. The front arches 39 of the frames 38 are prevented from being accidentally disconnected from the hooks 8 by the keepers 12, which can be readily operated to clear the hooks in changing the adjustment of the said frames.

To the rear of the frame 1 when the device is arranged for complete operation of all its parts a pair of drags 74 are loosely connected, so as to have a self-adjustment and also detachable at will for rearrangement in a manner hereinafter set forth. These drags are independent and of grate form, each comprising front and rear supporting-rods 75, having space-sleeves 76 thereon, with cross-braces 77 between the same at the center and against the outer ends. On the opposite ends of the rods 75 nuts 78 are applied and bear against the outermost and inner braces 77. The braces 77 have a series of openings 79 therethrough, which are alined when the parts are connected up, as shown, and therethrough extend a series of rods 80, running from end to end of each drag and slightly projecting beyond the opposite end braces 77. The braces 77 have a curvature in a longitudinal direction, and the openings and rods closely follow the same contour, thereby providing a curved working surface, so as to facilitate the movement of the drag over the soil and cause lumps to pass thereunder and not be pushed forward by the advance portions thereof. The metal brace 77 of each drag has a rear opening 81 formed therein, and in advance of the same is a second opening 82, as more clearly shown in Fig. 3, and at its front end the said metal brace also in part supports an upstanding ear 83, from which extend diverging brace-rods 84 to the opposite ends of the rear rod 75 to thereby rigidly hold the parts of the drag against bending or detrimental strain. The upper terminals of the ears 83 have eyes 85 therein for the purpose of connecting the said ears to the hooks 16 and which gives the front or advance portions of the drags a slight elevation to assist in the effective operation of pulverization. These ears 83 can be quickly disconnected from the hooks 16, and the gangs of teeth may be used alone to comminute and break up the soil without the said drags. When used together, however, the teeth cut through and throw over the soil and roll the clods and lumps outwardly from one cutter to the other and thoroughly break up the same, and afterward the drags follow over and pulverize such lumps as the teeth failed to break up. The surface of the soil after the drags have passed thereover remains soft, owing to the grated construction set forth, and the disadvantage accruing from a surface packing is avoided. The drags are held down through the medium of a bail 86, having lower hooked terminals removably fitted in the forward openings 82 when the drags are used with the teeth, the upper part of the bail having a central loop 87, on which is placed the clip-hook 35. By this means it will be observed that the weight of the driver or operator on the seat 33 is brought to bear on the drags, and the movement of the latter is taken up by the bail 28, connected to the front end of the support 31. The seat 33 can also be shifted on the support 31 and held in fixed adjusted position by means of a bolt 88, passing through the said seat and adapted to be inserted in any one of a series of openings 89, a guide-strap 90 extending transversely across the under part of the seat and permanently attached at its opposite ends to form between the same and an adjacent part of the seat a guide through which the support 31 extends. By varying the location of the seat 33 on the support 31, and particularly when moving said seat toward the rear, the weight of the operator or driver will be more nearly centered on the bail 86 and, through the latter, on the drags. The hooked terminals of the bail 86 have guards 91 over the same, which fit closely to the upper edges of the braces 77 and prevent the loose and accidental disengagement of the said hooked terminals, and immediately above the said guard horizontal bearings 92 are provided. The hooks, guards 91, and bearings 92 are formed by suitable bends.

In arranging the drags for use without the teeth the gangs of the latter are disconnected from the main frame by detaching the cutter-frames 38 from the hooks 8 and 15. The drags are then disconnected from the hooks 16, and after this has been accomplished the said drags are then brought up under the main frame 1, so that the ears 83 are adjacent to the hooks 8, and said hooks are inserted in the eyes 85 and locked against displacement by the keepers 12. The bail 86, which was detached from the forward openings 82 previous to the connection of the ears 83 with the hooks 8, is now dropped over the support 31 at a suitable distance from the seat 33 and so that the hooks will coincide with the rear openings 81. The clip-hook 35 is then loosened and detached and moved up over the support, so as to connect the bail 86 with the latter, the said clip-hook in this instance having its hooked portion closing down over the loop 87 of the bail, which straddles the said support. By this means the drags may be made to effectively serve their purpose at times when it is not necessary to use the teeth, and when the drags are so disposed the under edges of the side bars 2 of the frame 1 rest upon the bearings 92, adjacent to the hooks 81, to prevent the rear part of the main frame from dropping to the ground.

It will be seen from the foregoing disclosure, with the substitution of parts, that three implements can be made out of one with very little delay or inconvenience, and the draft necessary to effectively operate the several devices will depend upon the use of the teeth and drags together and either one alone, it being understood that when the drags are used alone less power will be required to pull them over the ground. The improved implement or machine is also adapted for use in various kinds of cultivation, and the gangs of teeth when used alone may be caused to straddle rows of plants both in large tracts and in confined places. Furthermore, one gang of teeth can be rendered inoperative while the other is at work, and, as before intimated, the inclined or beveled front edges 54 of the teeth provide for an easy clearance of obstructions, while the straight front edges 55 are to intercept the trash above the surface and prevent it from being forced below on the inclined or beveled edges 54 and also obviate clogging of the cutters as the latter are thrown forward. While the drags 74 will profitably serve as pulverizers and to finish the work of the cutters, they are intended principally to perform the function of levelers when following the said teeth.

Numerous advantages are derived from the present form of pulverizer in view of the multiplicity of uses to which it is adapted and the facility of substitution and rearrangement of parts. Furthermore, the entire device can be reduced to compact form for storage or the parts entirely disconnected from the main frame, and even in some instances it might be desirable to detach the cutters and separate the parts of the cutter-frames.

Changes in the proportions, size, and minor details of construction can be resorted to without in the least departing from the spirit of the invention or sacrificing any of the advantages thereof.

Having thus described the invention, what is claimed as new is—

1. In a device of the character set forth, the combination of a main frame, opposite independent gangs of cutters suspended therefrom, comprising front and rear series in each gang, independent holders for the series of cutters, means for vertically adjusting the gangs of cutters by devices exclusively connected thereto, and means for varying the interval between the cutters on the holders.

2. In a device of the character set forth, the combination of a main frame, opposite cutter-frames suspended therefrom and adapted to be adjusted laterally, independent holders on each frame having cutters thereon, and means for adjusting the said holders connected to the latter independent of the main frame.

3. In a device of the character set forth, the combination of a main frame, cutter-frames shiftably and removably suspended from the main frame, holders movably mounted on the cutter-frames, a series of cutters spaced apart on the said holders, and means for varying the interval between said cutters.

4. In a device of the character set forth, the combination of a main frame, gangs of cutters supported thereby, an elongated seat-support having a seat thereon, drags movably connected to the rear of the main frame, and a device extending up from the drags and adapted to be engaged by the seat-support.

5. In a device of the character set forth, the combination of a main frame, opposite gangs of detachable cutters supported by said main frame, rear detachable drags, an elongated seat-support having a seat movable thereon, and a bail removably connected to the drags and adapted to receive the pressure of the seat-support.

6. In a device of the character set forth, the combination of a main frame, a stop-loop movably carried by the rear thereof, an elongated seat-support having a seat thereon, opposite gangs of cutters detachably connected to the frame, drags separably and movably attached to the rear part of the frame, and means connected to the drags for receiving the pressure of the seat-support.

7. In a device of the character set forth, the combination of a main frame, having a seat-support with a seat thereon, opposite gangs of cutters detachably connected to said main frame, rear movable drags separably attached to the main frame, and means for applying the pressure of the seat-support to the said drags.

8. In a device of the character set forth, the combination of a main frame having a seat-support with a seat adjustable thereon, a clip-hook adjustably connected to said seat-support, opposite gangs of cutters removably connected to the main frame, rear drags movably and separably attached to said frame, and a bail removably and adjustably connected to the drags and adapted to be engaged by the clip-hook.

9. In a device of the character set forth, the combination of a main frame, a bail movably connected to a front part of said frame, a seat-support attached to said bail and having a seat thereon, earth-leveling devices movably and separably connected to said main frame, and a bail removably and adjustably attached to the earth-leveling devices and to the said support.

10. In a device of the character set forth, the combination of a main frame, having a movable seat-support with a seat thereon, earth-leveling devices removably connected to the said main frame, and movable devices between the earth-leveling devices and said seat-support.

11. In a device of the character set forth, the combination of a main frame, a seat-support having a seat thereon, earth-leveling devices removably connected to said main frame, and a bail adjustably attached to the seat-support and having a terminal formed with hooks to removably and adjustably engage the earth-leveling devices and also with guards and bearing-surfaces.

12. In a device of the character set forth, the combination of a main frame having a seat-support, earth-leveling devices removably connected to said main frame, and an intermediate connecting device between the seat-support and the earth-leveling devices having bearings for the main frame.

13. In a device of the character set forth, the combination of a main frame having connecting-hooks at the front and rear, keepers extending into a part of said hooks, and attachments for the main frame having projecting portions adapted to engage the hooks having the keepers.

14. In a device of the character set forth, the combination of a main frame, front and rear downwardly-turned hooks thereon, rear upwardly-turned hooks, opposite gangs of cutters, and drags, said gangs of cutters and drags being removably attachable to the said hooks.

15. In a device of the character set forth, the combination of a main frame, a seat-support extending thereover and provided with a seat, a rear stop-link, gangs of cutters removably attached to the frame, and rear drags having an upwardly-extending device adapted to be engaged by the seat-support.

16. In a device of the character set forth, the combination of a main frame, a drag comprising end and intermediate braces held at predetermined distances apart and having a series of alined openings therein, and a plurality of rods extending through the openings in the braces to thereby form an open structure, the braces being curved to provide a curved working surface.

17. In a device of the character set forth, the combination of a main frame having hooks thereon, and a cutter-frame supporting a series of cutters and having a front arch, a rear upstanding cross-tie and lower runners.

18. In a device of the character set forth, the combination of a main frame, a cutter-frame removably connected thereto and having retaining devices in reverse positions on opposite sides, and series of cutters supported by the cutter-frame and adapted to be engaged by the said retaining devices.

19. In a device of the character set forth, the combination of a main frame, independent cutter-holders connected to the said main frame, and substantially of U-shaped form, and a series of cutters movably and adjustably mounted on the said holders.

20. In a device of the character set forth, the combination of a main frame, a cutter-frame connected to the said main frame, cutter-holders continuous at one end and having one leg of each movably mounted on the said cutter-frame, and a series of cutters removably and adjustably held on the said holders.

21. In a device of the character set forth, the combination of a main frame, cutter-holders connected thereto, a series of cutters removably and adjustably applied to said holders, clamping-plates on the holders to engage the upper portions of the cutters, and spaced sleeves on the holders between the clamping-plates.

22. In a device of the character set forth, a cutter having slots in the front and upper edges opening out through the latter and adapted to be applied to or removed from a holding device without disassociating all of the series thereof.

23. A cutter for the purpose set forth, consisting of a thin metal plate of substantially-triangular form with a deflected apex extremity, and slots in the front and upper edges opening outwardly through the latter.

24. A cutter for the purpose set forth, having a rear straight edge and a front bevel running to a front straight edge and forming at the said rear edge a working point which is laterally deflected, the front straight edge and rear part of the upper edge having slots opening therethrough and arranged in planes at right angles to each other.

25. In a device of the character set forth, the combination of a cutter-holder consisting of parallel legs continuous at one end, a series of cutters removably mounted on said legs and having slots in the front and upper edges arranged in planes at right angles to each other, and means for fastening the said cutters on the holders.

In testimony that I claim the foregoing as my own I have hereto affixed my signature in the presence of two witnesses.

WILLIAM Z. BROWN.

Witnesses:
JOHN H. FARRINGTON,
E. A. BURT.